United States Patent
Liu et al.

(10) Patent No.: US 11,246,125 B2
(45) Date of Patent: Feb. 8, 2022

(54) REFERENCE SIGNAL SENDING METHOD, TERMINAL DEVICE, AND ACCESS NETWORK DEVICE

(71) Applicant: HUAWEI TECHNOLOGIES CO., LTD., Guangdong (CN)

(72) Inventors: Deping Liu, Beijing (CN); Zhenwei Lu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 16/577,830

(22) Filed: Sep. 20, 2019

(65) Prior Publication Data

US 2020/0022116 A1 Jan. 16, 2020

Related U.S. Application Data

(63) Continuation of application No. PCT/CN2018/079270, filed on Mar. 16, 2018.

(30) Foreign Application Priority Data

Mar. 31, 2017 (CN) .......................... 201710210775.5

(51) Int. Cl.
*H04W 72/04* (2009.01)
*H04L 5/00* (2006.01)
*H04W 92/18* (2009.01)

(52) U.S. Cl.
CPC ......... *H04W 72/042* (2013.01); *H04L 5/0005* (2013.01); *H04L 5/0048* (2013.01); *H04W 72/044* (2013.01); *H04W 92/18* (2013.01)

(58) Field of Classification Search
CPC .. H04W 72/042; H04W 72/044; H04L 5/0005
See application file for complete search history.

(56) References Cited

U.S. PATENT DOCUMENTS

| | | | |
|---|---|---|---|
| 10,809,351 B1 * | 10/2020 | Cho | ......................... G01S 5/10 |
| 2013/0294381 A1 | 11/2013 | Wang et al. | |
| 2015/0055503 A1 | 2/2015 | Xia et al. | |
| 2017/0171690 A1 | 6/2017 | Kim et al. | |

FOREIGN PATENT DOCUMENTS

| | | |
|---|---|---|
| CN | 103079217 A | 5/2013 |
| CN | 103944665 A | 7/2014 |
| CN | 105490791 A | 4/2016 |

(Continued)

OTHER PUBLICATIONS

Ericsson,"Sidelink ResourceAllocation in V2X",3GPP TSG-RAN WG2 #93 Tdoc R2-161566,Malta, Feb. 15-19, 2016, 10 pages.

(Continued)

*Primary Examiner* — Joshua L Schwartz
(74) *Attorney, Agent, or Firm* — Fish & Richardson P.C.

(57) ABSTRACT

The present disclosure relates to reference signal sending or receiving methods and systems, terminal devices, and access network devices. One example method includes sending, by a first device, first control information to a second device, where the first control information is used to indicate a first resource used by the first device to send a reference signal, and sending, by the first device, the reference signal to the second device on the first resource.

20 Claims, 8 Drawing Sheets

(56) References Cited

FOREIGN PATENT DOCUMENTS

| | | | |
|---|---|---|---|
| EP | 3280172 A2 | 2/2018 | |
| EP | 3349388 A1 | 7/2018 | |
| JP | 2013017016 A | 1/2013 | |
| JP | 2016501489 A | 1/2016 | |
| JP | 2018520607 A | 7/2018 | |
| WO | 2012092720 A1 | 7/2012 | |
| WO | 2013166705 A1 | 11/2013 | |
| WO | 2015176255 A1 | 11/2015 | |
| WO | 2016013826 A1 | 1/2016 | |
| WO | 2016159715 A2 | 10/2016 | |
| WO | 2017026477 A1 | 2/2017 | |
| WO | 2017043947 A1 | 3/2017 | |

OTHER PUBLICATIONS

3GPP TS 23.285 V14.2.0 (Mar. 2017), 3rd Generation Partnership Project, Technical Specification Group Services and System Aspects, Architecture enhancements for V2X services(Release 14), 35 pages.

Extended European Search Report issued in European Application No. 18776618.3 dated Jan. 2, 2020, 10 pages.
Office Action issued in Chinese Application No. 201710210775.5 dated Mar. 3, 2020, 19 pages (With English Translation).
PCT International Search Report and Written Opinion in International Application No. PCT/CN2018/079,270, dated May 30, 2018, 15 pages (With English Translation).
Huawei, HiSilicon, "Design of DL DMRS for data transmission," 3GPP TSG RAN WG1 Meeting #88bis, Spokane, USA, Apr. 3 7, 2017, R1-1704233, 6 pages.
Office Action issued in Japanese Application No. 2019-546032 dated Nov. 4, 2020, 9 pages (with English translation).
ZTE, ZTE Microelectronics, "Simulation results for downlink DMRS," 3GPP TSG RAN WG1 NR Ad-Hoc Meeting, R1-1700137, Spokane, USA, Jan. 16-20, 2017, 13 pages.
Office Action issued in Japanese Application No. 2019-546032 dated Aug. 31, 2021, 8 pages (with English translation).
Office Action issued in Chinese Application No. 201710210775.5 dated Jun. 2, 2021, 7 pages.

\* cited by examiner

REFERENCE SIGNAL SENDING METHOD, TERMINAL DEVICE, AND ACCESS NETWORK DEVICE

CROSS-REFERENCE TO RELATED APPLICATIONS

This application is a continuation of International Application No. PCT/CN2018/079270, filed on Mar. 16, 2018, which claims priority to Chinese Patent Application No. 201710210775.5, filed on Mar. 31, 2017. The disclosures of the aforementioned applications are hereby incorporated by reference in their entireties.

TECHNICAL FIELD

Embodiments of this application relate to a communications system, and in particular, to a reference signal sending method, a terminal device, and an access network device.

BACKGROUND

An access network device or a terminal device estimates a channel by using a reference signal falling within a time-frequency resource range. For a downlink, the terminal device receives a reference signal from the access network device for channel estimation; for an uplink, the access network device receives a reference signal from the terminal device for channel estimation; and for a sidelink, the terminal device receives a reference signal from another terminal device for channel estimation.

Device to device (Device to Device, D2D) communication, vehicle to vehicle (Vehicle to Vehicle, V2V) communication, vehicle to pedestrian V2P (Vehicle to Pedestrian, V2P) communication, or vehicle to infrastructure/network V2I/N (Vehicle to Infrastructure/Network, V2I/N) communication is a technology in which terminal devices (terminal device) directly communicate with each other. V2V, V2P, and V2I/N are collectively referred to as V2X, in other words, communication between a vehicle and anything.

As shown in FIG. 1, V2X communication is used as an example. In order that channel estimation can be completed by using a reference signal even when a vehicle runs at a highest speed, one of subframes for sending data includes two slots. There are 14 symbols in total, and fixed four symbols thereof are used to transmit reference signals. Specifically, in resources allocated to data, all frequency domain resources in the four symbols are used to transmit the reference signals. When the speed of the vehicle is relatively low, in such the existing reference signal manner, a relatively large quantity of symbols are occupied, and consequently resources are wasted. In addition, the existing method of sending the reference signals by occupying the fixed four symbols lacks flexibility.

Therefore, a resource-saving and highly flexible technical solution to reference signal sending is urgently needed in the industry.

SUMMARY

Embodiments of this application provide a reference signal sending method, a terminal device, and an access network device to improve flexibility of sending a reference signal and save resources.

According to a first aspect, a reference signal sending method is provided, including: sending, by a first device, first control information to a second device, where the first control information is used to indicate a first resource used by the first device to send a reference signal; and sending, by the first device, the reference signal to the second device on the first resource.

In a possible design, the first resource includes a first time-frequency resource, and the sending, by the first device, the reference signal to the second device on the first resource includes: sending, by the first device, the reference signal to the second device on the first time-frequency resource.

In a possible design, the first resource includes a first time domain resource, and the sending, by the first device, the reference signal to the second device on the first resource includes: sending, by the first device, the reference signal to the second device on a time-frequency resource that includes the first time domain resource and a predefined frequency domain resource; or the first resource includes a first frequency domain resource, and the sending, by the first device, the reference signal to the second device on the first resource includes: sending, by the first device, the reference signal to the second device on a time-frequency resource that includes the first frequency domain resource and a predefined time domain resource.

In a possible design, the first device includes an access network device, and the second device includes a terminal device.

In a possible design, the first control information is included in downlink control information.

In a possible design, the first device includes a first terminal device, and the second device includes a second terminal device.

In a possible design, the first control information is included in sidelink control information.

In a possible design, the first control information is received by the first terminal device from an access network device.

According to a second aspect, a reference signal receiving method is provided, including: receiving, by a second device, first control information from a first device, where the first control information is used to indicate a first resource used by the first device to send a reference signal; and receiving, by the second device, the reference signal from the first device on the first resource.

In a possible design, the first resource includes a first time-frequency resource, and the receiving, by the second device, the reference signal from the first device on the first resource includes: receiving, by the second device, the reference signal from the first device on the first time-frequency resource.

In a possible design, the first resource includes a first time domain resource, and the receiving, by the second device, the reference signal from the first device on the first resource includes: receiving, by the second device, the reference signal from the first device on a time-frequency resource that includes the first time domain resource and a predefined frequency domain resource; or the first resource includes a first frequency domain resource, and the receiving, by the second device, the reference signal from the first device on the first resource includes: receiving, by the second device, the reference signal from the first device on a time-frequency resource that includes the first frequency domain resource and a predefined time domain resource.

In a possible design, the first device includes an access network device, and the second device includes a terminal device.

In a possible design, the first control information is included in downlink control information.

In a possible design, the first device includes a first terminal device, and the second device includes a second terminal device.

In a possible design, the first control information is included in sidelink control information.

In a possible design, the first control information is received by the first terminal device from an access network device.

According to a third aspect, a first device is provided, including: a sending unit, configured to send first control information to a second device, where the first control information is used to indicate a first resource used by the first device to send a reference signal, where the sending unit is further configured to send the reference signal to the second device on the first resource.

In a possible design, the first resource includes a first time-frequency resource, and that the sending unit is further configured to send the reference signal to the second device on the first resource includes: the sending unit sends the reference signal to the second device on the first time-frequency resource.

In a possible design, the first resource includes a first time domain resource, and that the sending unit is further configured to send the reference signal to the second device on the first resource includes: the sending unit sends the reference signal to the second device on a time-frequency resource that includes the first time domain resource and a predefined frequency domain resource; or the first resource includes a first frequency domain resource, and that the sending unit is further configured to send the reference signal to the second device on the first resource includes: the sending unit sends the reference signal to the second device on a time-frequency resource that includes the first frequency domain resource and a predefined time domain resource.

In a possible design, the first device includes an access network device, and the second device includes a terminal device.

In a possible design, the first control information is included in downlink control information.

In a possible design, the first device includes a first terminal device, and the second device includes a second terminal device.

In a possible design, the first control information is included in sidelink control information.

In a possible design, the first device further includes a receiving unit, and the first control information is received by the receiving unit from an access network device.

In a possible design, the processing unit may be a processor (processor), the sending unit may be a transmitter (transmitter) or a transceiver (transceiver), and the receiving unit may be a receiver (receiver) or a transceiver.

According to a fourth aspect, a second device is provided, including: a receiving unit, configured to receive first control information from a first device, where the first control information is used to indicate a first resource used by the first device to send a reference signal, where the receiving unit is further configured to receive the reference signal from the first device on the first resource.

In a possible design, the first resource includes a first time-frequency resource, and that the receiving unit is further configured to receive the reference signal from the first device on the first resource includes: the receiving unit receives the reference signal from the first device on the first time-frequency resource.

In a possible design, the first resource includes a first time domain resource, and that the receiving unit is further configured to receive the reference signal from the first device on the first resource includes: the receiving unit receives the reference signal from the first device on a time-frequency resource that includes the first time domain resource and a predefined frequency domain resource; or the first resource includes a first frequency domain resource, and that the receiving unit is further configured to receive the reference signal from the first device on the first resource includes: the receiving unit receives the reference signal from the first device on a time-frequency resource that includes the first frequency domain resource and a predefined time domain resource.

In a possible design, the first device includes an access network device, and the second device includes a terminal device.

In a possible design, the first control information is included in downlink control information.

In a possible design, the first device includes a first terminal device, and the second device includes a second terminal device.

In a possible design, the first control information is included in sidelink control information.

In a possible design, the first control information is received by the first terminal device from an access network device.

In a possible design, the processing unit may be a processor (processor), the sending unit may be a transmitter (transmitter) or a transceiver (transceiver), and the receiving unit may be a receiver (receiver) or a transceiver.

According to a fifth aspect, a reference signal sending method is provided, including: receiving, by a terminal device, first control information from an access network device, where the first control information is used to indicate a first resource used by the terminal device to send a reference signal; and sending, by the terminal device, the reference signal to the access network device on the first resource.

In a possible design, the first resource includes a first time-frequency resource, and the sending, by the terminal device, the reference signal to the access network device on the first resource includes: sending, by the terminal device, the reference signal to the access network device on the first time-frequency resource.

In a possible design, the first resource includes a first time domain resource, and the sending, by the terminal device, the reference signal to the access network device on the first resource includes: sending, by the terminal device, the reference signal to the access network device on a time-frequency resource that includes the first time domain resource and a predefined frequency domain resource; or the first resource includes a first frequency domain resource, and the sending, by the terminal device, the reference signal to the access network device on the first resource includes: sending, by the terminal device, the reference signal to the access network device on a time-frequency resource that includes the first frequency domain resource and a predefined time domain resource.

In a possible design, the first control information is included in downlink control information.

According to a sixth aspect, a reference signal receiving method is provided, including: sending, by an access network device, first control information to a terminal device, where the first control information is used to indicate a first resource used by the terminal device to send a reference signal; and receiving, by the access network device, the reference signal from the terminal device on the first resource.

In a possible design, the first resource includes a first time-frequency resource, and the receiving, by the access network device, the reference signal from the terminal device on the first resource includes: receiving, by the access network device, the reference signal from the terminal device on the first time-frequency resource.

In a possible design, the first resource includes a first time domain resource, and the receiving, by the access network device, the reference signal from the terminal device on the first resource includes: receiving, by the access network device, the reference signal from the terminal device on a time-frequency resource that includes the first time domain resource and a predefined frequency domain resource; or the first resource includes a first frequency domain resource, and the receiving, by the access network device, the reference signal from the terminal device on the first resource includes: receiving, by the access network device, the reference signal from the terminal device on a time-frequency resource that includes the first frequency domain resource and a predefined time domain resource.

In a possible design, the first control information is included in downlink control information.

According to a seventh aspect, a terminal device is provided, including: a receiving unit, configured to receive first control information from an access network device, where the first control information is used to indicate a first resource used by the terminal device to send a reference signal; and a sending unit, configured to send the reference signal to the access network device on the first resource.

In a possible design, the first resource includes a first time-frequency resource, and that the sending unit is configured to send the reference signal to the access network device on the first resource includes: the sending unit sends the reference signal to the access network device on the first time-frequency resource.

In a possible design, the first resource includes a first time domain resource, and that the sending unit is configured to send the reference signal to the access network device on the first resource includes: the sending unit sends the reference signal to the access network device on a time-frequency resource that includes the first time domain resource and a predefined frequency domain resource; or the first resource includes a first frequency domain resource, and that the sending unit is configured to send the reference signal to the access network device on the first resource includes: the sending unit sends the reference signal to the access network device on a time-frequency resource that includes the first frequency domain resource and a predefined time domain resource.

In a possible design, the first control information is included in downlink control information.

In a possible design, the processing unit may be a processor (processor), the sending unit may be a transmitter (transmitter) or a transceiver (transceiver), and the receiving unit may be a receiver (receiver) or a transceiver.

According to an eighth aspect, an access network device is provided, including: a sending unit, configured to send first control information to a terminal device, where the first control information is used to indicate a first resource used by the terminal device to send a reference signal; and a receiving unit, configured to receive the reference signal from the terminal device on the first resource.

In a possible design, the first resource includes a first time-frequency resource, and that the receiving unit is configured to receive the reference signal from the terminal device on the first resource includes: the receiving unit receives the reference signal from the terminal device on the first time-frequency resource.

In a possible design, the first resource includes a first time domain resource, and that the receiving unit is configured to receive the reference signal from the terminal device on the first resource includes: the receiving unit receives the reference signal from the terminal device on a time-frequency resource that includes the first time domain resource and a predefined frequency domain resource; or the first resource includes a first frequency domain resource, and that the receiving unit is configured to receive the reference signal from the terminal device on the first resource includes: the receiving unit receives the reference signal from the terminal device on a time-frequency resource that includes the first frequency domain resource and a predefined time domain resource.

In a possible design, the first control information is included in downlink control information.

In a possible design, the processing unit may be a processor (processor), the sending unit may be a transmitter (transmitter) or a transceiver (transceiver), and the receiving unit may be a receiver (receiver) or a transceiver.

In a ninth aspect, an embodiment of this application provides a computer storage medium, configured to store a computer software instruction used by the foregoing access network, where the computer software instruction includes a program designed to execute the foregoing aspects.

According to a tenth aspect, an embodiment of this application provides a computer storage medium, configured to store a computer software instruction used by the foregoing terminal device, where the computer software instruction includes a program designed to execute the foregoing aspects.

Based on the foregoing solution, the sending device sends the first control information to the receiving device, where the first control information is used to indicate the first resource used by the sending device to send or receive the reference signal; and then the sending device sends and the receiving device receives the reference signal on the first resource. Therefore, a transmission resource of the reference signal is no longer fixed, and a quantity of transmission resources, locations of the transmission resources, or the like may be determined based on factors such as a speed of the terminal device. For example, when the speed is low, a relatively small quantity of resources may be configured for sending the reference signal. In addition, the transmission resource of the reference signal is indicated by the first control information, so as to improve flexibility of sending the reference signal.

DESCRIPTION OF EMBODIMENTS

Figure 1:
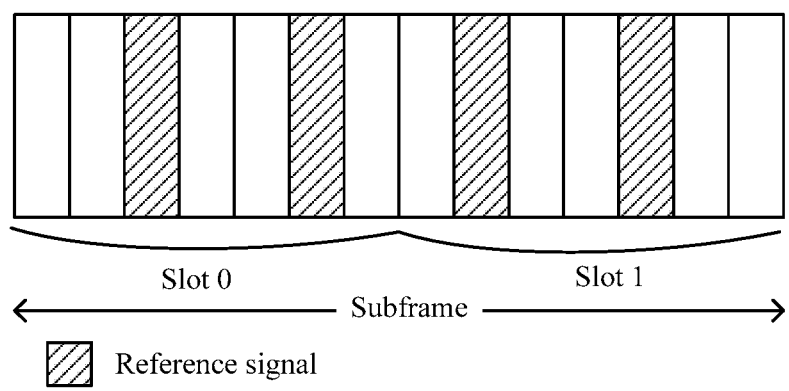
FIG. 1 is a schematic diagram of a resource for sending a reference signal according to an embodiment of this application.
Figure 2:
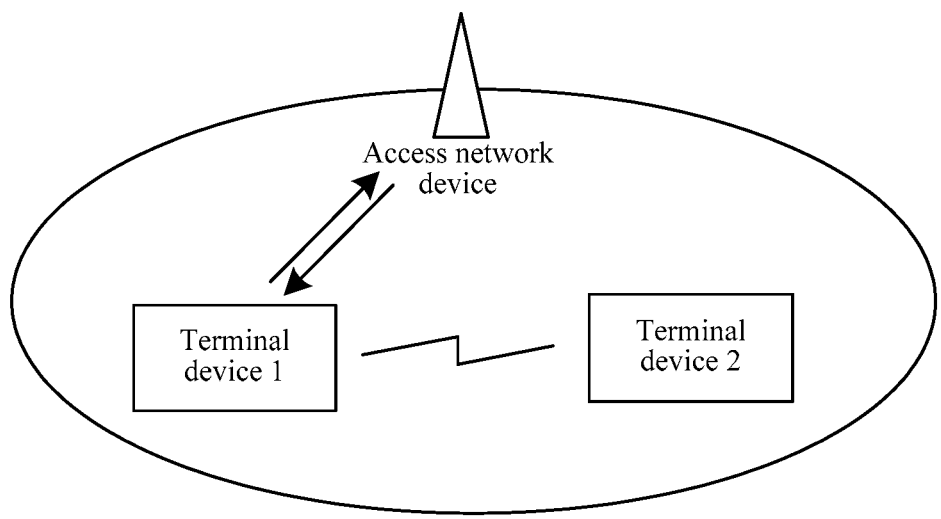
FIG. 2 is a schematic architectural diagram of a system according to an embodiment of this application.

As shown in FIG. 2, for downlink channel estimation, an access network device sends a reference signal to a terminal device 1, and the terminal device 1 performs channel estimation on a downlink channel based on the reference signal received from the access network device. For uplink channel estimation, the terminal device 1 sends a reference signal to the access network device, and the access network device performs channel estimation on an uplink channel based on the reference signal received from the terminal device 1. For sidelink channel estimation, the terminal device 1 sends a reference signal to a terminal device 2, and the terminal device 2 performs channel estimation on a sidelink channel based on the reference signal received from the terminal device 1.

The access network device according to this application is an apparatus deployed in a radio access network to provide a radio communication function for a terminal device. The access network device may include various forms of base stations (Base Station, BS), such as a macro base station or a micro base station, or a relay station or an access point. In systems based on different radio access technologies, a name of a device having a function of an access network device may vary. For example, the device is referred to as an evolved NodeB (evolved NodeB, eNB or eNodeB for short) in an LTE network, or referred to as a NodeB (NodeB) or the like in a third generation 3G network, or referred to as a road side unit (Road Side Unit, RSU) in V2V communication. For ease of description, in this application, the foregoing apparatuses configured to provide a radio communication function for the terminal device are collectively referred to as access network devices.

The terminal device according to this application may include various handheld devices such as a vehicle-mounted device, a wearable device, and a computing device that have a radio communication function, or may include other processing devices, mobile stations (Mobile station, MS), terminals (terminal), user equipment (User Equipment, UE), or the like that are connected to a wireless modem. For ease of description, in this application, the devices mentioned above are collectively referred to as terminal devices.

The embodiments of this application are described below in more detail with reference to specific examples.

Figure 3:
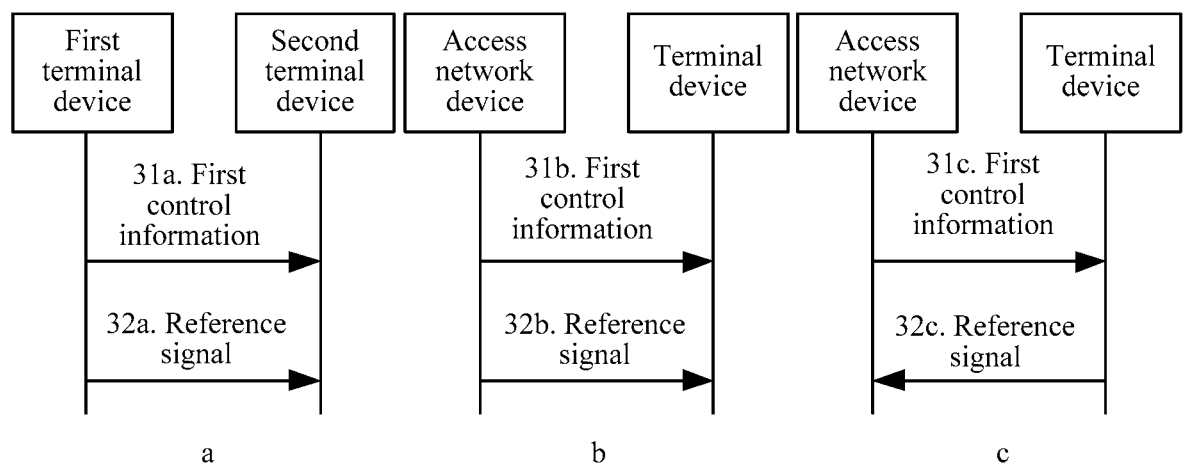
FIG. 3 shows a reference signal sending or receiving method and system according to an embodiment of this application.

FIG. 3*a* shows a reference signal sending or receiving method and system in V2X sidelink communication. Detailed steps are as follows:

Step 31*a*: A first terminal device sends first control information to a second terminal device, and the second terminal device receives the first control information from the first terminal device, where the first control information is used to indicate a first resource used by the first terminal device to send a reference signal; and Step 32*a*: The first terminal device sends the reference signal to the second terminal device on the first resource, and the second terminal device receives the reference signal from the first terminal device on the first resource.

Figure 4:
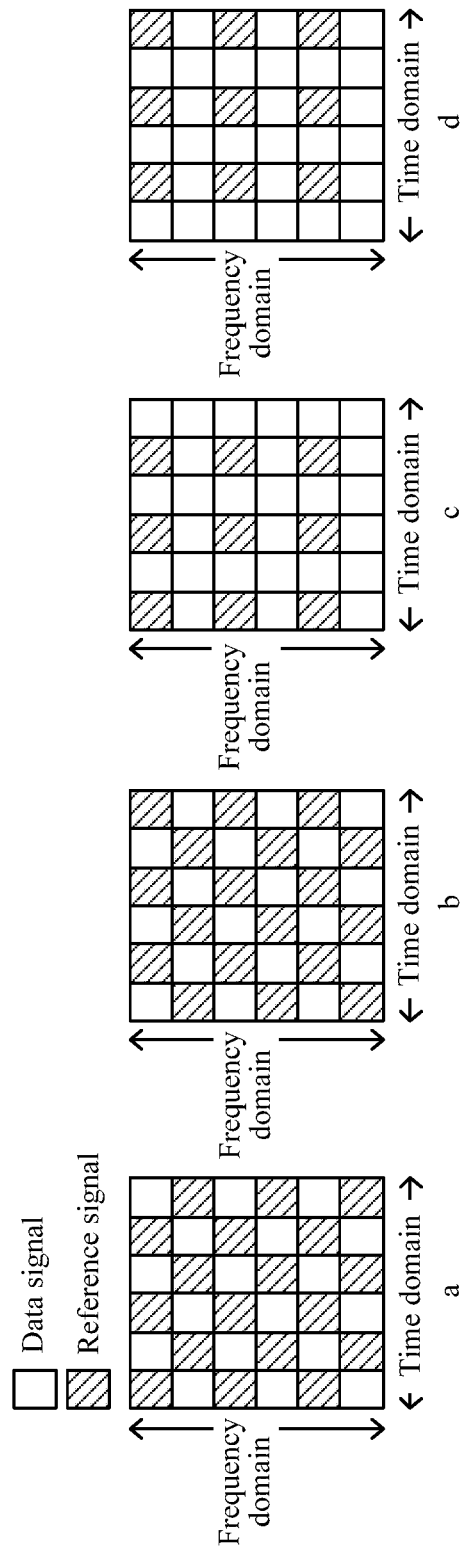
FIG. 4 is a diagram of a resource for sending a reference signal according to an embodiment of this application.

In an optional embodiment, the first resource includes a first time-frequency resource, and the method includes: sending, by the first terminal device, the reference signal to the second terminal device on the first time-frequency resource; and receiving, by the second terminal device, the reference signal from the first terminal device on the first time-frequency resource. Specifically, as shown in FIG. 4, a time-frequency resource shown in FIG. 4 is divided into 6 units in time domain, and also divided into 6 units in frequency domain. In this way, a square in FIG. 4 is a minimum time-frequency unit. In FIG. 4, a minimum unit in time domain may be one of a subframe, a slot, a mini-slot, or a symbol. Optionally, a unit of resources allocated or occupied in time domain is one of a subframe, a slot, a mini-slot, or a symbol; and a minimum unit in the frequency domain may be a subcarrier or another frequency domain resource granularity. In FIG. 4, the first resource indicated by the first control information is a time-frequency resource. To be specific, the first control information indicates both a time domain resource for sending the reference signal and a frequency domain resource for sending the reference signal. The time-frequency resource for sending the reference signal may have four different time-frequency resource patterns (pattern): a, b, c, and d. The first control information may indicate a specific time-frequency resource for sending the reference signal, for example, a time-frequency resource a, or a time-frequency resource b. The first control information may also indicate a, b, c, or d as the time-frequency resource for sending the reference signal. Optionally, a correspondence between a value indicated by the first control information and a transmission resource of the reference signal may be fixed or configurable, for example, may be determined and sent by the access network device to the first terminal device. When the correspondence is fixed, for example, if the first control information has four values: 0, 1, 2, and 3, and the transmission resource of the reference signal has four different time-frequency resource patterns: a, b, c, and d, correspondences 0-a, 1-b, 2-c, and 3-d are fixed. When the correspondence is configurable, for example, if the first control information has four values: 0, 1, 2, and 3, and the transmission resource of the reference signal is eight different time-frequency resource patterns: a, b, c, d, e, g, and h, then the access network device may determine correspondences between 0, 1, 2, and 3 and each time-frequency resource pattern and notify the correspondences to the first terminal device, where the correspondences are variable and may be 0-a, 1-b, 2-c, and 3-d, or may be 0-e, 1-f, 2-g, and 3-h, or the like, or may be other forms of correspondences.

Figure 5:
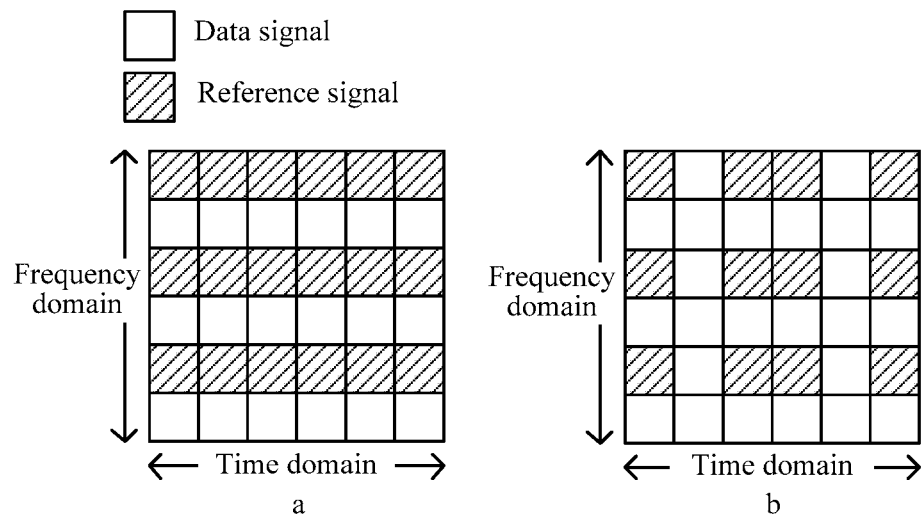
FIG. 5 is a diagram of a resource for sending a reference signal according to an embodiment of this application.

In an optional embodiment, the first resource includes a first time domain resource, and the method includes: sending, by the first terminal device, the reference signal to the second terminal device on a time-frequency resource that includes the first time domain resource and a predefined frequency domain resource; and receiving, by the second terminal device, the reference signal from the first terminal device on a time-frequency resource that includes the first time domain resource and a predefined frequency domain resource. Specifically, as shown in FIG. 5, the first control information merely indicates that time-frequency resources for sending the reference signal in time domain are the first unit to the sixth unit (a form a), or are the first, third, fourth, and sixth units (a form b). For the form a or the form b, the time-frequency resource for sending the reference signal in frequency domain is a predefined frequency domain resource. For example, the first, third, and fifth units in the frequency domain are all used to send the reference signal.

To be specific, a shadow part in FIG. 5a or FIG. 5b is used to send and receive the reference signal. The sending device and the receiving device may determine, based on the first control information, the time domain resource for sending the reference signal, and determine, based on the time domain resource and a predefined frequency domain resource, the time-frequency resource for sending the reference signal, and then send or receive the reference signal on the time-frequency resource. Optionally, the predefined frequency domain resource may be a fixed frequency domain resource or a configurable frequency domain resource. Optionally, the first control information may indicate a specific time domain resource for sending the reference signal. Optionally, the first control information may also indicate different forms of time domain resources for sending the reference signal, for example, the form a or the form b, where the form a is the first unit to the sixth unit, and the form b is the first, third, fourth, and sixth units. Such form a or b may be fixed or configurable.

Figure 6:
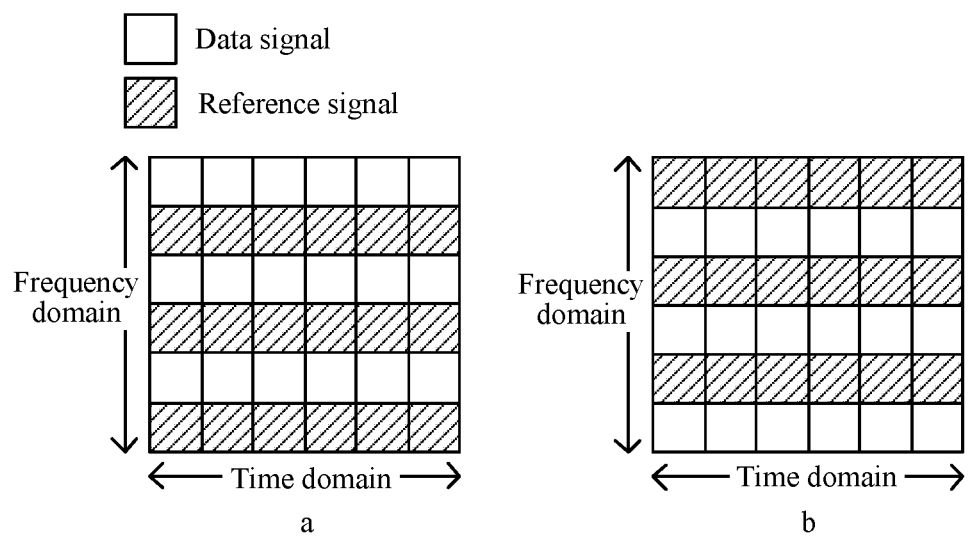
FIG. 6 is a diagram of a resource for sending a reference signal according to an embodiment of this application.

In an optional embodiment, the first resource includes a first frequency domain resource, and the method includes: sending, by the first terminal device, the reference signal to the second terminal device on a time-frequency resource that includes the first frequency domain resource and a predefined time domain resource; and receiving, by the second terminal device, the reference signal from the first terminal device on a time-frequency resource that includes the first frequency domain resource and a predefined time domain resource. Specifically, as shown in FIG. 6, the first control information indicates only that time-frequency resources for sending the reference signal in frequency domain are the second, fourth, and sixth units (a form a), or are the first, third, and fifth units (a form b), and that a time-frequency resource for sending the reference signal in time domain is a predefined time domain resource. For example, all units in time domain are used to send the reference signal. To be specific, a shadow part in FIG. 6a or FIG. 6b is used to send and receive the reference signal. The sending device and the receiving device may determine, based on the first control information, the frequency domain resource for sending the reference signal, and determine, based on the frequency domain resource and the predefined time domain resource, the time-frequency resource for sending the reference signal, and then send or receive the reference signal on the time-frequency resource. Optionally, the predefined time domain resource is a fixed time domain resource or a configurable time domain resource. Optionally, the first control information may indicate a specific frequency domain resource for sending the reference signal. Optionally, the frequency domain resources for sending the reference signal may be the predefined form a, that is, the second, fourth, and sixth units, or the form b, that is, the first, third, and fifth units. The first control information may also indicate the form a or the form b as a time domain resource for sending the reference signal.

In an optional embodiment, the first control information is included in sidelink control information.

FIG. 3b shows a reference signal sending or receiving method and system in downlink communication. Detailed steps are as follows:

Step 31b: An access network device sends first control information to a terminal device, and the terminal device receives the first control information from the access network device, where the first control information is used to indicate a first resource used by the access network device to send a reference signal.

Step 32b: The access network device sends the reference signal to the terminal device on the first resource, and the terminal device receives the reference signal from the access network device on the first resource.

In an optional embodiment, the first resource includes a first time-frequency resource, and the method includes: sending, by the access network device, the reference signal to the terminal device on the first time-frequency resource; and receiving, by the terminal device, the reference signal from the access network device on the first time-frequency resource. For details, refer to the embodiment in FIG. 3a. No repeated description is given herein again.

In an optional embodiment, the first resource includes a first time domain resource, and the method includes: sending, by the access network device, the reference signal to the terminal device on a time-frequency resource that includes the first time domain resource and a predefined frequency domain resource; and receiving, by the terminal device, the reference signal from the access network device on a time-frequency resource that includes the first time domain resource and a predefined frequency domain resource. For details, refer to the embodiment in FIG. 3a. No repeated description is given herein again.

In an optional embodiment, the first resource includes a first frequency domain resource, and the method includes: sending, by the access network device, the reference signal to the terminal device on a time-frequency resource that includes the first frequency domain resource and a predefined time domain resource; and receiving, by the terminal device, the reference signal from the access network device on a time-frequency resource that includes the first frequency domain resource and a predefined time domain resource. For details, refer to the embodiment in FIG. 3a. No repeated description is given herein again.

In an optional embodiment, the first control information is included in downlink control information or RRC signaling.

FIG. 3c shows a reference signal sending or receiving method and system in uplink communication. Detailed steps are as follows:

Step 31c: A terminal device receives first control information from an access network device, and the access network device sends the first control information to the terminal device, where the first control information is used to indicate a first resource used by the terminal device to send a reference signal.

Step 32c: The terminal device sends the reference signal to the access network device on the first resource, and the access network device receives the reference signal from the terminal device on the first resource.

In an optional embodiment, the first resource includes a first time-frequency resource, and the method includes: sending, by the terminal device, the reference signal to the access network device on the first time-frequency resource; and receiving, by the access network device, the reference signal from the terminal device on the first time-frequency resource. For details, refer to the embodiment in FIG. 3a. No repeated description is given herein again.

In an optional embodiment, the first resource includes a first time domain resource, and the method includes: sending, by the terminal device, the reference signal to the access network device on a time-frequency resource that includes the first time domain resource and a predefined frequency domain resource; and receiving, by the access network device, the reference signal from the terminal device on a time-frequency resource that includes the first time domain resource and a predefined frequency domain resource. For details, refer to the embodiment in FIG. 3a. No repeated description is given herein again.

In an optional embodiment, the first resource includes a first frequency domain resource, and the method includes: sending, by the terminal device, the reference signal to the access network device on a time-frequency resource that includes the first frequency domain resource and a predefined time domain resource; and receiving, by the access network device, the reference signal from the terminal device on a time-frequency resource that includes the first frequency domain resource and a predefined time domain resource. For details, refer to the embodiment in FIG. 3a. No repeated description is given herein again.

In the embodiments in FIG. 3a, FIG. 3b, and FIG. 3c, optionally, the first control information indicates a time-frequency resource pattern (pattern). The first control information is included in sidelink control information, downlink control information, or RRC signaling.

In the embodiments in FIG. 3a, FIG. 3b, and FIG. 3c, optionally, the first control information may be indicated by a new field added in the sidelink control information or the downlink control information, or may be indicated by an existing field in the sidelink control information or the downlink control information. In the following description, the sidelink control information is used as an example. When an existing field in the sidelink control information is used for indication, a possible manner is to indicate the first control information through a cyclic redundancy check (Cyclic Redundancy Check, CRC) bit scrambled by using different masks (mask). For example, different masks may correspond to different resources for sending the reference signal. For a receiver side, a mask on a transmitter side may be determined by blind detection. Further, resources for sending the reference signal that correspond to different masks may be obtained.

In the embodiments in FIG. 3a, FIG. 3b, and FIG. 3c, optionally, for data sending under semi-persistent scheduling (Semi-Persistent Scheduling, SPS), the reference signal may also be periodically sent correspondingly, and the first control information may indicate a resource for a periodically sent reference signal. Optionally, resources for a plurality of periodically sent reference signals may be indicated in same first control information, that is, indicated centrally; or resources for a plurality of periodically sent reference signals may be indicated in a plurality of pieces of first control information separately, that is, indicated separately.

In the embodiments in FIG. 3a, FIG. 3b, and FIG. 3c, optionally, when data is transmitted for a plurality of times, the reference signal is also correspondingly transmitted for a plurality of times. For transmission resources of the plurality of reference signals, transmission resources or transmission resource patterns of subsequent reference signals may be determined based on a transmission resource or a transmission resource pattern of a previous reference signal, for example, may be identical or related to the transmission resource or the transmission resource pattern of the previous reference signal; or the transmission resources or transmission resource patterns of the subsequent reference signals may also be indicated by the first control information, or the like.

In an optional embodiment of the embodiments in FIG. 3a, FIG. 3b, and FIG. 3c, the first terminal device or the terminal device sends auxiliary information to the access network device. The auxiliary information includes a speed and/or acceleration and/or a movement direction and/or a geographical location and/or channel state information and/or the like of the first terminal device. The access network device determines a transmission resource of the reference signal based on the auxiliary information. The access network device sends the first control information to the first terminal device or the terminal device, and the first control information is used to indicate the first resource for sending the reference signal. Optionally, the first control information is included in downlink control information (Downlink Control Information, DCI) or radio resource control (Radio Resource Control, RRC) signaling sent by the access network device to the first terminal device or the terminal device.

In the embodiments in FIG. 3a, FIG. 3b, and FIG. 3c, optionally, when a plurality of antenna ports or a plurality of layers are used for sending reference signals, transmission resources of the reference signals on the antenna ports or the layers may be different, and the first control information may indicate the transmission resources of the reference signals on the plurality of antenna ports or layers.

In the embodiments in FIG. 3a, FIG. 3b, and FIG. 3c, optionally, the downlink control information or the sidelink control information further indicates a second resource, and the first resource is a part of the second resource. To be specific, the transmission resource of the reference signal is a part of the second resource. The second resource is a time-frequency resource used by the access network device to send data to the terminal device, or the second resource is a time-frequency resource used by the terminal device to send data to the access network device, or the second resource is a time-frequency resource used by the first terminal device to send data to a second terminal device. The first resource may be determined based on the second resource and the first control information. For example, the first control information indicates that the reference signal is sent on the second, fourth, and sixth units of the time domain (for example, a form a), and therefore, the second, fourth, and sixth units of the time domain are the second, fourth, and sixth units in time domain in the second resource, and the sending device sends and the receiving device receives the reference signal on the second, fourth, and sixth units in time domain in the second resource. In another example, the first control information indicates a time-frequency resource pattern of the reference signal. The time-frequency resource pattern is a transmission resource location of the reference signal in a time-frequency resource range, for example, in a resource block (Resource Block, RB). The downlink control information or the sidelink control information indicates that resources for sending the data are five resource blocks. Therefore, in each resource block, the transmission resource of the reference signal is determined based on the time-frequency resource pattern indicated by the first control information for the reference signal, and the sending device sends and the receiving device receives the reference signal on the transmission resource of the reference signal within the five resource blocks.

According to this embodiment of this application, the sending device sends the first control information to the receiving device. The first control information is used to indicate the first resource used by the sending device to send or receive the reference signal (the sending device may be a first terminal device or an access network device, and the receiving device may be a terminal device or a second terminal device), and the sending device sends and the receiving device receives the reference signal on the first resource. Therefore, a transmission resource of the reference signal is no longer fixed, and a quantity of transmission resources, locations of the transmission resources, or the like may be determined based on factors such as a speed of the terminal device. For example, when the speed is low, a relatively small quantity of resources may be configured for sending the reference signal. In addition, the transmission resource of the reference signal is indicated by the first control information, so as to improve flexibility of sending the reference signal.

Figure 7:
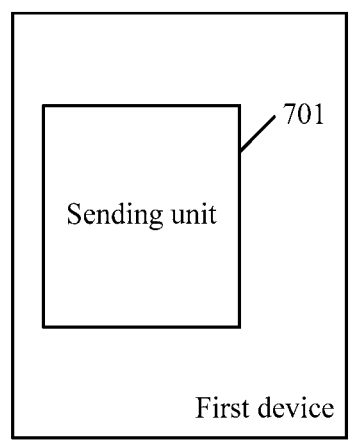
FIG. 7 and FIG. 8 are a first device according to an embodiment of this application.

FIG. 7 is a possible schematic structural diagram of a first device configured to perform the method according to the embodiments in FIG. 3a and FIG. 3b. The first device includes a sending unit 701, and the first device may be a first terminal device or an access network device.

The sending unit 701 is configured to send first control information to a second device, where the first control information is used to indicate a first resource used by the first device to send a reference signal.

The sending unit 701 is further configured to send the reference signal to the second device on the first resource.

In an optional embodiment, the first resource includes a first time-frequency resource, and that the sending unit is further configured to send the reference signal to the second device on the first resource includes: the sending unit sends the reference signal to the second device on the first time-frequency resource.

In an optional embodiment, the first resource includes a first time domain resource, and that the sending unit is further configured to send the reference signal to the second device on the first resource includes: the sending unit sends the reference signal to the second device on a time-frequency resource that includes the first time domain resource and a predefined frequency domain resource.

In an optional embodiment, the first resource includes a first frequency domain resource, and that the sending unit is further configured to send the reference signal to the second device on the first resource includes: the sending unit sends the reference signal to the second device on a time-frequency resource that includes the first frequency domain resource and a predefined time domain resource.

In an optional embodiment, for downlink communication, the first device includes an access network device, and the second device includes a terminal device. Optionally, the first control information is included in downlink control information.

In an optional embodiment, for sidelink communication, the first device includes a first terminal device, and the second device includes a second terminal device. Optionally, the first control information is included in sidelink control information. Optionally, the first device further includes a receiving unit, and the first control information is received by the receiving unit from an access network device.

Figure 8:
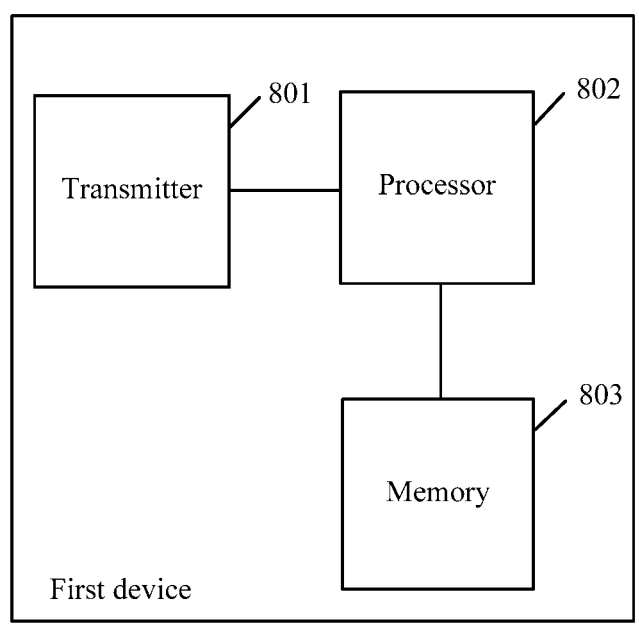

In an optional embodiment, the sending unit 701 may be a transmitter 801 or a transceiver. The first device may further include a processor 802, the first device may further include a memory 803, and the memory 803 is configured to store program code and data of the first device, as specifically shown in FIG. 8.

According to this embodiment of this application, the first device sends the first control information to the second device. The first control information is used to indicate the first resource used by the first device to send or receive the reference signal (the first device may be a first terminal device or an access network device, and the second device may be a terminal device or a second terminal device), and the first device sends and the second device receives the reference signal on the first resource. Therefore, a transmission resource of the reference signal is no longer fixed, and a quantity of transmission resources, locations of the transmission resources, or the like may be determined based on factors such as a speed of the terminal device. For example, when the speed is low, a relatively small quantity of resources may be configured for sending the reference signal. In addition, the transmission resource of the reference signal is indicated by the first control information, so as to improve flexibility of sending the reference signal.

Figure 9:
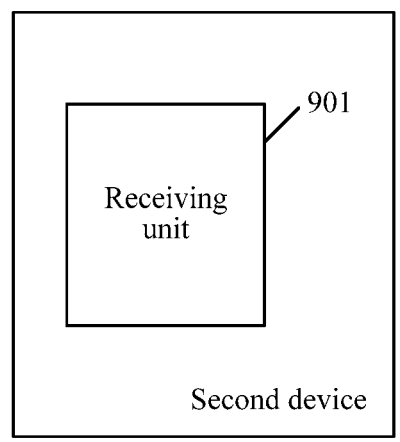
FIG. 9 and FIG. 10 are a second device according to an embodiment of this application.

FIG. 9 is a possible schematic structural diagram of a second device configured to perform the method according to the embodiments in FIG. 3a and FIG. 3b. The second device includes a receiving unit 901, and the second device may be a second terminal device or a terminal device.

The receiving unit 901 is configured to receive first control information from a first device, where the first control information is used to indicate a first resource used by the first device to send a reference signal.

The receiving unit 901 is further configured to receive the reference signal from the first device on the first resource.

In an optional embodiment, the first resource includes a first time-frequency resource, and that the receiving unit is further configured to receive the reference signal from the first device on the first resource includes: the receiving unit receives the reference signal from the first device on the first time-frequency resource.

In an optional embodiment, the first resource includes a first time domain resource, and that the receiving unit is further configured to receive the reference signal from the first device on the first resource includes: the receiving unit receives the reference signal from the first device on a time-frequency resource that includes the first time domain resource and a predefined frequency domain resource.

In an optional embodiment, the first resource includes a first frequency domain resource, and that the receiving unit is further configured to receive the reference signal from the first device on the first resource includes: the receiving unit receives the reference signal from the first device on a time-frequency resource that includes the first frequency domain resource and a predefined time domain resource.

In an optional embodiment, the first device includes an access network device, and the second device includes a terminal device. Optionally, the first control information is included in downlink control information.

In an optional embodiment, the first device includes a first terminal device, and the second device includes a second terminal device. Optionally, the first control information is included in sidelink control information. Optionally, the first control information is received by the first terminal device from an access network device.

Figure 10:
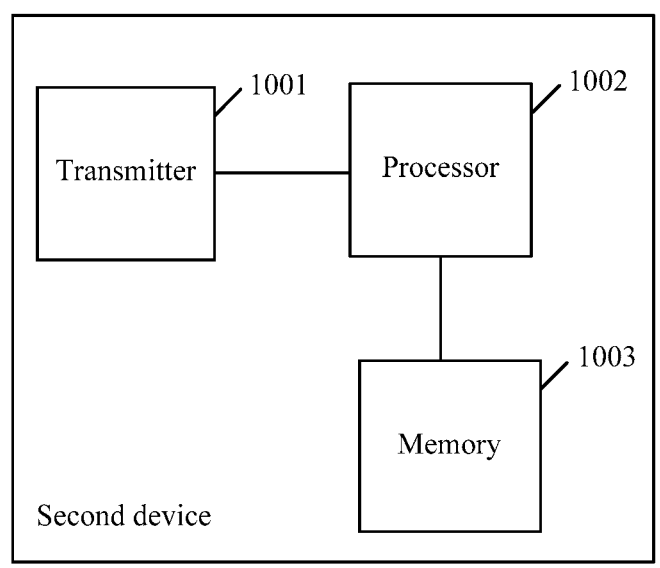

In an optional embodiment, the receiving unit 901 may be a receiver 1001 or a transceiver. The second device may further include a processor 1002, the second device may further include a memory 1003, and the memory 1003 is configured to store program code and data of the first device, as specifically shown in FIG. 10.

According to this embodiment of this application, the first device sends the first control information to the second device. The first control information is used to indicate the first resource used by the first device to send or receive the reference signal (the first device may be a first terminal device or an access network device, and the second device may be a terminal device or a second terminal device), and the first device sends and the second device receives the reference signal on the first resource. Therefore, a transmission resource of the reference signal is no longer fixed, and a quantity of transmission resources, locations of the transmission resources, or the like may be determined based on factors such as a speed of the terminal device. For example, when the speed is low, a relatively small quantity of resources may be configured for sending the reference signal. In addition, the transmission resource of the reference signal is indicated by the first control information, so as to improve flexibility of sending the reference signal.

Figure 11:
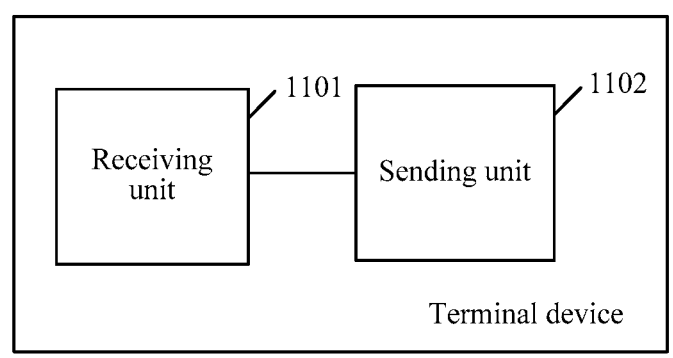
FIG. 11 and FIG. 12 are a terminal device according to an embodiment of this application.

FIG. 11 is a possible schematic structural diagram of a terminal device configured to perform the method according to the embodiment in FIG. 3c. The terminal device includes a receiving unit 1101 and a sending unit 1102.

The receiving unit 1101 is configured to receive first control information from an access network device, where the first control information is used to indicate a first resource used by the terminal device to send a reference signal.

The sending unit 1102 is configured to send the reference signal to the access network device on the first resource.

In an optional embodiment, the first resource includes a first time-frequency resource, and that the sending unit 1102 is configured to send the reference signal to the access network device on the first resource includes: the sending unit 1102 sends the reference signal to the access network device on the first time-frequency resource.

In an optional embodiment, the first resource includes a first time domain resource, and that the sending unit 1102 is configured to send the reference signal to the access network device on the first resource includes: the sending unit 1102 sends the reference signal to the access network device on a time-frequency resource that includes the first time domain resource and a predefined frequency domain resource.

In an optional embodiment, the first resource includes a first frequency domain resource, and that the sending unit 1102 is configured to send the reference signal to the access network device on the first resource includes: the sending unit 1102 sends the reference signal to the access network device on a time-frequency resource that includes the first frequency domain resource and a predefined time domain resource.

In an optional embodiment, the first control information is included in downlink control information.

Figure 12:
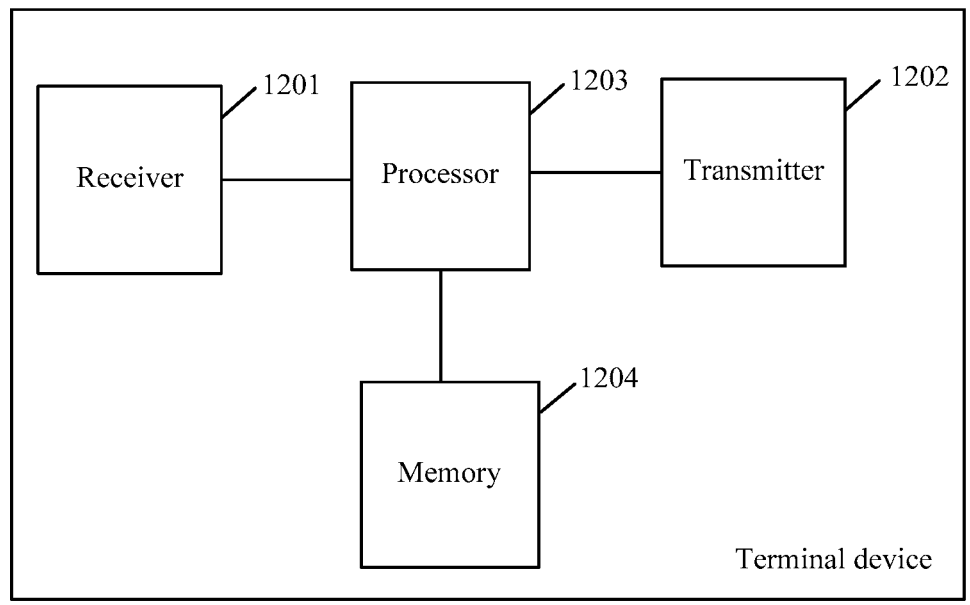

In an optional embodiment, the receiving unit 1101 may be a receiver 1201 or a transceiver, and the sending unit 1102 may be a transmitter 1202 or a transceiver. The first device may further include a processor 1203, the first device may further include a memory 1204, and the memory 1204 is configured to store program code and data of the terminal device, as specifically shown in FIG. 12.

According to this embodiment of this application, the access network device sends the first control information to the terminal device, where the first control information is used to indicate the first resource used by the terminal device to send the reference signal; and then the access network device receives the reference signal on the first resource. Therefore, a transmission resource of the reference signal is no longer fixed, and a quantity of transmission resources, locations of the transmission resources, or the like may be determined based on factors such as a speed of the terminal device. For example, when the speed is low, a relatively small quantity of resources may be configured for sending the reference signal. In addition, the transmission resource of the reference signal is indicated by the first control information, so as to improve flexibility of sending the reference signal.

Figure 13:
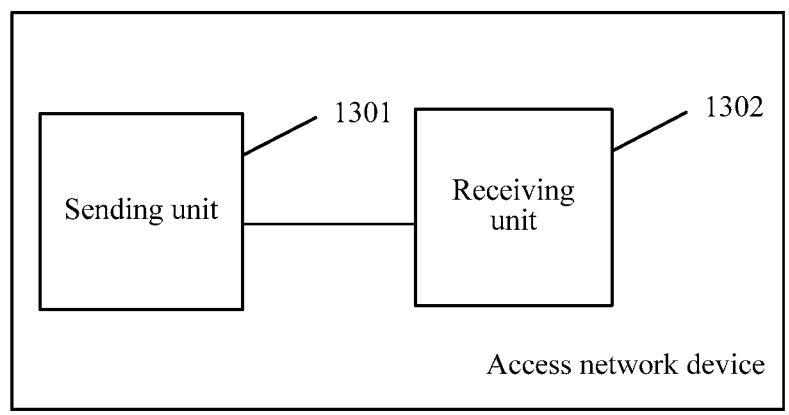
FIG. 13 and FIG. 14 are an access network device according to an embodiment of this application.

FIG. 13 is a possible schematic structural diagram of an access network device configured to perform the method according to the embodiment in FIG. 3c. The terminal device includes a sending unit 1301 and a receiving unit 1302.

The sending unit 1301 is configured to send first control information to a terminal device, where the first control information is used to indicate a first resource used by the terminal device to send a reference signal.

The receiving unit 1302 is configured to receive the reference signal from the terminal device on the first resource.

In an optional embodiment, the first resource includes a first time-frequency resource, and that the receiving unit 1302 is configured to receive the reference signal from the terminal device on the first resource includes: the receiving unit 1302 receives the reference signal from the terminal device on the first time-frequency resource.

In an optional embodiment, the first resource includes a first time domain resource, and that the receiving unit 1302 is configured to receive the reference signal from the terminal device on the first resource includes: the receiving unit 1302 receives the reference signal from the terminal device on a time-frequency resource that includes the first time domain resource and a predefined frequency domain resource.

In an optional embodiment, the first resource includes a first frequency domain resource, and that the receiving unit 1302 is configured to receive the reference signal from the terminal device on the first resource includes: the receiving unit 1302 receives the reference signal from the terminal device on a time-frequency resource that includes the first frequency domain resource and a predefined time domain resource.

In an optional embodiment, the first control information is included in downlink control information.

Figure 14:
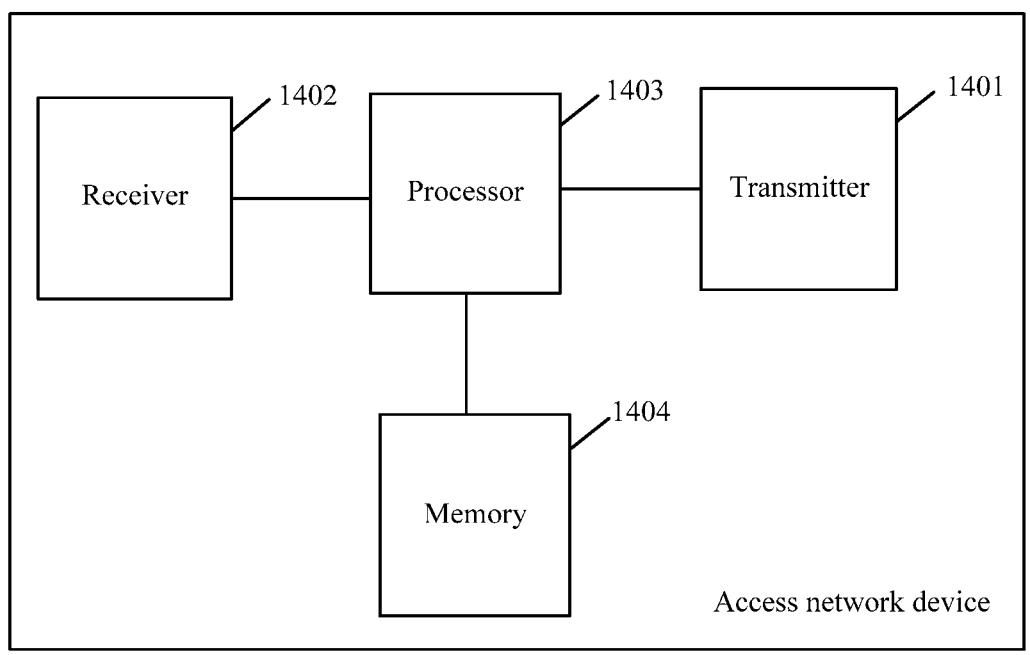

In an optional embodiment, the receiving unit 1302 may be a receiver 1402 or a transceiver, and the sending unit 1301 may be a transmitter 1401 or a transceiver. The first device may further include a processor 1403, the first device may further include a memory 1404, and the memory 1404 is configured to store program code and data of the terminal device, as specifically shown in FIG. 14.

According to this embodiment of this application, the access network device sends the first control information to the terminal device, where the first control information is used to indicate the first resource used by the terminal device to send the reference signal; and then the access network device receives the reference signal on the first resource. Therefore, a transmission resource of the reference signal is no longer fixed, and a quantity of transmission resources, locations of the transmission resources, or the like may be determined based on factors such as the speed of the terminal device. For example, when the speed is low, a relatively small quantity of resources may be configured for sending the reference signal. In addition, the transmission resource of the reference signal is indicated by the first control information, so as to improve flexibility of sending the reference signal.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A reference signal sending method, comprising:
   receiving, by a first device, auxiliary information from a second device, wherein the auxiliary information comprises one or more of a speed, an acceleration, or a movement direction of the second device;
   determining, by the first device, a first resource based on the auxiliary information;
   sending, by the first device, first control information to the second device, wherein the first control information indicates the first resource used by the first device to send a reference signal; and
   sending, by the first device, the reference signal to the second device on the first resource.

2. The method according to claim 1, wherein:
   the first resource comprises a first time-frequency resource, and the sending, by the first device, the reference signal to the second device on the first resource comprises:
      sending, by the first device, the reference signal to the second device on the first time-frequency resource; or
   the first resource comprises a first time domain resource, and the sending, by the first device, the reference signal to the second device on the first resource comprises:
      sending, by the first device, the reference signal to the second device on a time-frequency resource that comprises the first time domain resource and a predefined frequency domain resource; or
   the first resource comprises a first frequency domain resource, and the sending, by the first device, the reference signal to the second device on the first resource comprises:
      sending, by the first device, the reference signal to the second device on a time-frequency resource that comprises the first frequency domain resource and a predefined time domain resource.

3. The method according to claim 1, wherein the first device comprises an access network device, and wherein the second device comprises a terminal device.

4. The method according to claim 3, wherein the first control information is comprised in downlink control information.

5. The method according to claim 1, wherein the first device comprises a first terminal device, and wherein the second device comprises a second terminal device.

6. The method according to claim 5, wherein the first control information is comprised in sidelink control information.

7. The method according to claim 5, wherein the first control information is received by the first terminal device from an access network device.

8. A reference signal receiving method, comprising:
   sending, to an access network device by a second device, auxiliary information, wherein the auxiliary information comprises one or more of a speed, an acceleration, or a movement direction of the second device;
   receiving, by the second device, first control information from a first device, wherein the first control information indicates a first resource used by the first device to send a reference signal, and the first resource is determined based on the auxiliary information; and
   receiving, by the second device, the reference signal from the first device on the first resource.

9. The method according to claim 8, wherein:
   the first resource comprises a first time-frequency resource, and the receiving, by the second device, the reference signal from the first device on the first resource comprises:
      receiving, by the second device, the reference signal from the first device on the first time-frequency resource; or
   the first resource comprises a first time domain resource, and the receiving, by the second device, the reference signal from the first device on the first resource comprises:
      receiving, by the second device, the reference signal from the first device on a time-frequency resource that comprises the first time domain resource and a predefined frequency domain resource; or
   the first resource comprises a first frequency domain resource, and the receiving, by the second device, the reference signal from the first device on the first resource comprises:
      receiving, by the second device, the reference signal from the first device on a time-frequency resource that comprises the first frequency domain resource and a predefined time domain resource.

10. The method according to claim 8, wherein the first device comprises the access network device, and wherein the second device comprises a terminal device.

11. The method according to claim 10, wherein the first control information is comprised in downlink control information.

12. The method according to claim 8, wherein the first device comprises a first terminal device, and wherein the second device comprises a second terminal device.

13. The method according to claim 12, wherein the first control information is comprised in sidelink control information.

14. The method according to claim 12, wherein the first control information is received by the first terminal device from the access network device.

15. A first device, comprising:
   at least one processor;
   a non-transitory computer-readable storage medium coupled to the at least one processor and storing programming instructions for execution by the at least one processor to:
      receive auxiliary information from a second device, wherein the auxiliary information comprises one or more of a speed, an acceleration, or a movement direction of the second device;
      determine a first resource based on the auxiliary information;
      send first control information to the second device, wherein the first control information indicates the first resource used by the first device to send a reference signal; and
      send the reference signal to the second device on the first resource.

16. The first device according to claim 15, wherein:
   the first resource comprises a first time-frequency resource, and that the sending the reference signal to the second device on the first resource comprises:
      sending the reference signal to the second device on the first time-frequency resource; or
   the first resource comprises a first time domain resource, and that the sending the reference signal to the second device on the first resource comprises:
      sending the reference signal to the second device on a time-frequency resource that comprises the first time domain resource and a predefined frequency domain resource; or
   the first resource comprises a first frequency domain resource, and that the sending the reference signal to the second device on the first resource comprises:
      sending the reference signal to the second device on a time-frequency resource that comprises the first frequency domain resource and a predefined time domain resource.

17. The first device according to claim 15, wherein the first device comprises an access network device, and wherein the second device comprises a terminal device.

18. The first device according to claim 17, wherein the first control information is comprised in downlink control information.

19. The first device according to claim 15, wherein the first device comprises a first terminal device, and wherein the second device comprises a second terminal device.

20. The first device according to claim 19, wherein the first control information is comprised in sidelink control information.

* * * * *